US010286619B2

(12) United States Patent
Grandin et al.

(10) Patent No.: US 10,286,619 B2
(45) Date of Patent: May 14, 2019

(54) METHOD AND ARRANGEMENT FOR THE CUSTOMIZATION OF A FOOTWEAR, MORE PARTICULARLY A SPORTS FOOTWEAR

(71) Applicant: Tecnica Group S.P.A., Giavera Del Montello (TV) (IT)

(72) Inventors: Giorgio Grandin, Giavera Del Montello (IT); Dino Maccari, Giavera Del Montello (IT)

(73) Assignee: TECNICA GROUP S.P.A., Giavera del Montello (TV) (IT)

( * ) Notice: Subject to any disclaimer, the term of this patent is extended or adjusted under 35 U.S.C. 154(b) by 459 days.

(21) Appl. No.: 15/079,118

(22) Filed: Mar. 24, 2016

(65) Prior Publication Data
US 2016/0279889 A1    Sep. 29, 2016

(30) Foreign Application Priority Data

Mar. 25, 2015   (IT) ................ 10201509845

(51) Int. Cl.
*A43B 5/04*      (2006.01)
*B29D 35/00*     (2010.01)
(Continued)

(52) U.S. Cl.
CPC ............ *B29D 35/00* (2013.01); *A43B 5/04* (2013.01); *A43B 5/0435* (2013.01); *A43D 3/08* (2013.01);
(Continued)

(58) Field of Classification Search
CPC .......... A43B 5/0435; A43B 5/04; A43D 3/08; A43D 95/10; B29D 35/00; B29D 35/0054; B29K 2105/253
(Continued)

(56) References Cited

U.S. PATENT DOCUMENTS 3,419,974 A    1/1969   Lange
3,613,271 A    10/1971   Geller
(Continued)

FOREIGN PATENT DOCUMENTS

DE         3805721 A1    12/1988
GB         380978 A     9/1932
(Continued)

OTHER PUBLICATIONS

Italian Search Report and Written Opinion issued in connection with counterpart co-pending Italian Patent Application filed on Mar. 25, 2015.

*Primary Examiner* — Philip C Tucker
*Assistant Examiner* — Jimmy R Smith, Jr.
(74) *Attorney, Agent, or Firm* — Howson & Howson LLP

(57) ABSTRACT

A method and corresponding arrangement for customization of footwear, more particularly sports footwear, comprising an element made of a thermoplastic material, are provided. The method includes heating the element made of thermoplastic material until its temperature rises above a predetermined threshold and locally applying, from the outside of the footwear, a traction force to the element made of thermoplastic material, the traction force being oriented towards the outside of the footwear, so as to locally deform the thermoplastic material to adapt it to the morphology of the particular user. Correspondingly, the system comprises heating means, intended to heat the element made of thermoplastic material, and shaping means, arranged outside the footwear and intended to locally engage the outer surface of the element made of thermoplastic material and to apply a traction force to the element made of thermoplastic material, the traction force being oriented towards the outside of the footwear.

4 Claims, 5 Drawing Sheets

(51) Int. Cl.
  *A43D 95/10*   (2006.01)
  *A43D 3/08*   (2006.01)
  *B29K 101/12*   (2006.01)
  *B29K 105/00*   (2006.01)

(52) U.S. Cl.
  CPC ......... *A43D 95/10* (2013.01); *B29D 35/0054* (2013.01); *B29K 2101/12* (2013.01); *B29K 2105/253* (2013.01)

(58) Field of Classification Search
  USPC ....................................................... 264/571
  See application file for complete search history.

(56) References Cited

U.S. PATENT DOCUMENTS

| | | | |
|---|---|---|---|
| 3,848,286 | A | 11/1974 | Kahmann |
| 5,275,775 | A * | 1/1994 | Riecken .................... A61F 5/14 |
| | | | 12/142 N |
| 5,337,432 | A | 8/1994 | Pirhonen |
| 2007/0200264 | A1 | 8/2007 | Prutzman et al. |
| 2008/0000109 | A1 | 1/2008 | Challande |
| 2013/0134638 | A1* | 5/2013 | Klein ....................... B29C 51/10 |
| | | | 264/510 |

FOREIGN PATENT DOCUMENTS

| | | |
|---|---|---|
| JP | S53-059558 A | 5/1978 |
| WO | 2014/015354 A1 | 1/2014 |

* cited by examiner

METHOD AND ARRANGEMENT FOR THE CUSTOMIZATION OF A FOOTWEAR, MORE PARTICULARLY A SPORTS FOOTWEAR

BACKGROUND

The present invention relates to a method and a corresponding arrangement for the customization of a footwear, i.e. for adapting the footwear to the specific morphology of the particular user. More specifically, the present invention relates to a method and arrangement for the customization of a footwear, more particularly a sports footwear, comprising an element made of thermoplastic material.

According to prior art, footwear are manufactured in a variety of sizes that are different in length and width. However, each footwear size has standard length and width and not all the users with the same foot size have foot with the same morphology. It results that, while the size is correct, often the footwear does not fit the particular morphology of the user's foot. This drawback is particularly felt in the field of sports footwear, as the user's feet—during sports practice—are subject to considerable efforts.

Moreover, in the field of sports footwear, the conformity of the footwear to the specific morphology of the particular user remarkably affects not only the user's comfort, but also his/her performances.

The aforesaid drawback turns to be particularly limiting in the case where the sports footwear comprises a substantially rigid element.

Reference can be made, by way of example, to ski boots, which usually comprise a substantially soft inner element or inner liner and a substantially rigid outer element or outer shell. In the case of ski boots, not only does the conformity of the footwear to the morphology of the foot of the particular user increases the user's comfort, but it also improves the maneuverability of the ski, since even minimal movements of the user's foot are transmitted effectively to the ski boot and from this to the ski.

Similar improvements to the user's comfort as well as to his/her performances can be obtained for other similar sports footwear comprising a substantially rigid outer shell, such as, for instance, roller skates or ice skates.

It is also apparent that making custom-made footwear, while allowing efficient customization on one hand, would on the other hand involve high manufacturing costs and, consequently, very high, non-competitive market prices. In the past methods and arrangements for the customization of sports footwear were developed starting from a standard, non-customized article, which could therefore be manufactured on a large scale.

Still referring to the (non-limiting) example of ski boots, the known methods and arrangements can be classified into three categories:
  methods and arrangements providing for modifying the shape and size of the inner liner for adapting it to the morphology of the user's foot;
  methods and arrangements providing for introducing an insert with variable shape and size between the user's foot and the inner liner or between the inner liner and the outer shell; and
  methods and arrangements providing for modifying the shape and size of the outer shell for adapting it to the morphology of the user's foot.

Referring to the last category, the known methods and arrangements provide for making the outer shell of the ski boot from a thermoplastic material, whereby its shape and size can be modified if it is heated to a temperature higher than a predetermined threshold. The known methods and arrangements further provide that, once the outer shell has been heated, a pressure is applied to the shell from the outside, so that the shell is pressed against the user's foot.

In this respect, there can be cited U.S. Pat. No. 3,613,271, in which pressure is applied manually to the heated shell, or also U.S. Pat. No. 3,848,286, in which the ski boot is held under vacuum, whereby it is the atmospheric pressure of the surrounding environment that presses the shell against the user's foot. Such methods and arrangements can be effective in cases where the user's foot is, at least locally, small with respect to the ski boot shell. In such cases, the compression exerted by the shell causes the shell to adapt itself to the morphology of the user's foot, thus eliminating gaps between the user's foot and the ski boot, which gaps might lead to poor comfort and worse sports performances.

However, the known methods and arrangements are not applicable to cases in which the user's foot is, at least locally, large with respect to the shell of the ski boot. Such is the case, for instance, with users having very protruding malleoli or having a very wide plantar surface, especially in the metatarsal region. It is apparent that this foot conformation may involve a troublesome, if not painful, pressure against the inner wall of the ski boot, which significantly limits the user's comfort, especially during sports practice.

However, in these cases, the known methods and arrangements, which provide for pressing the shell of the boot against the user's foot, can only further worsen the situation.

The main object of the present invention is to overcome this drawback of prior art, by providing an alternative method and arrangement for the customization of a footwear, more particularly of a sports footwear. More in detail, the main object of the present invention is to provide a method and arrangement for the customization of a sports footwear, more particularly a sports footwear, which can be effectively applied to those cases in which the user's foot is—at least locally—large with respect to the footwear of the correct size.

Another object of the present invention is to provide a method and an arrangement for the customization of a footwear, more particularly a sports footwear, that allow to customize the footwear while the user's foot is inserted in the footwear.

These and other objects are achieved with the method and the arrangement as claimed in the appended claims.

SUMMARY

The method according to the invention mainly comprises the steps of:
  providing a footwear comprising at least one element made of thermoplastic material;
  heating the element made of thermoplastic material until its temperature rises above a predetermined threshold;
  locally applying, from the outside of the footwear, a traction force to the element made of thermoplastic material, the traction force being oriented towards the outside of the footwear.

Correspondingly, the arrangement according to the invention comprises:
  heating means intended to heat the element made of thermoplastic material until its temperature rises above the predetermined threshold;
  shaping means, arranged outside the footwear and intended to locally engage with the outer surface of the element made of thermoplastic material and to apply a traction force to the element made of thermoplastic material, the traction force being oriented towards the outside of the footwear.

It is to be noted that herein by "inside" of the footwear it is meant the space inside the footwear intended to accommodate the user's foot, while by "outside" it is meant the surrounding environment.

It is further to be noted that herein "thermoplastic material" means a polymer-based material which, when heated to a sufficient temperature, can be brought to a viscous state in which it can be shaped. In particular, herein "thermoplastic material" is intended to comprise both thermoplastic polymers and composite materials in which thermoplastic polymers are mixed or filled with additives such as, for instance, composite materials in which thermoplastic polymers are reinforced with fibers.

Owing to the method and arrangement according to the invention, it is possible to locally deform the element made of thermoplastic material of the footwear in such a manner that the inner volume of the footwear is locally increased so as to comfortably receive especially protruding parts of the user's foot.

Advantageously, the method and arrangement according to the invention are adapted to locally act in the more sensitive regions, such as for instance, the malleolar region and/or the metatarsal region and/or the toe region of the foot.

In this way, the user can buy the footwear with the most appropriate size, even when this entails unpleasant localized pressure points, and locally adapt the shape and the size of the footwear in order to eliminate the pressure points.

According to a preferred embodiment of the invention, the shaping means of the arrangement according to the invention comprise suction means and the step of applying a traction force in the method according to the invention is carried out by locally applying vacuum conditions to the outer surface of the element made of thermoplastic material.

According to another preferred embodiment of the invention, the shaping means of the arrangement according to the invention comprise mechanical traction means and the step of applying a traction force in the method according to the invention is carried out by locally applying a mechanical traction force to the outer surface of the element made of thermoplastic material.

BRIEF DESCRIPTION OF THE DRAWINGS

Further features and advantages of the invention will become more apparent from the following detailed description of some preferred embodiments of the invention, given by way of non-limiting example with reference to the annexed drawings, in which.

DETAILED DESCRIPTION

The preferred embodiments of the invention described below in detail refer to the application of the invention to a ski boot. These embodiment are in no way to be intended as limiting the scope of the invention and the invention can be applied to any footwear comprising at least one element made of thermoplastic material for which it is deemed necessary or advantageous to customize the shape of the footwear for adapting it to the specific morphology of a particular user.

Figure 1:
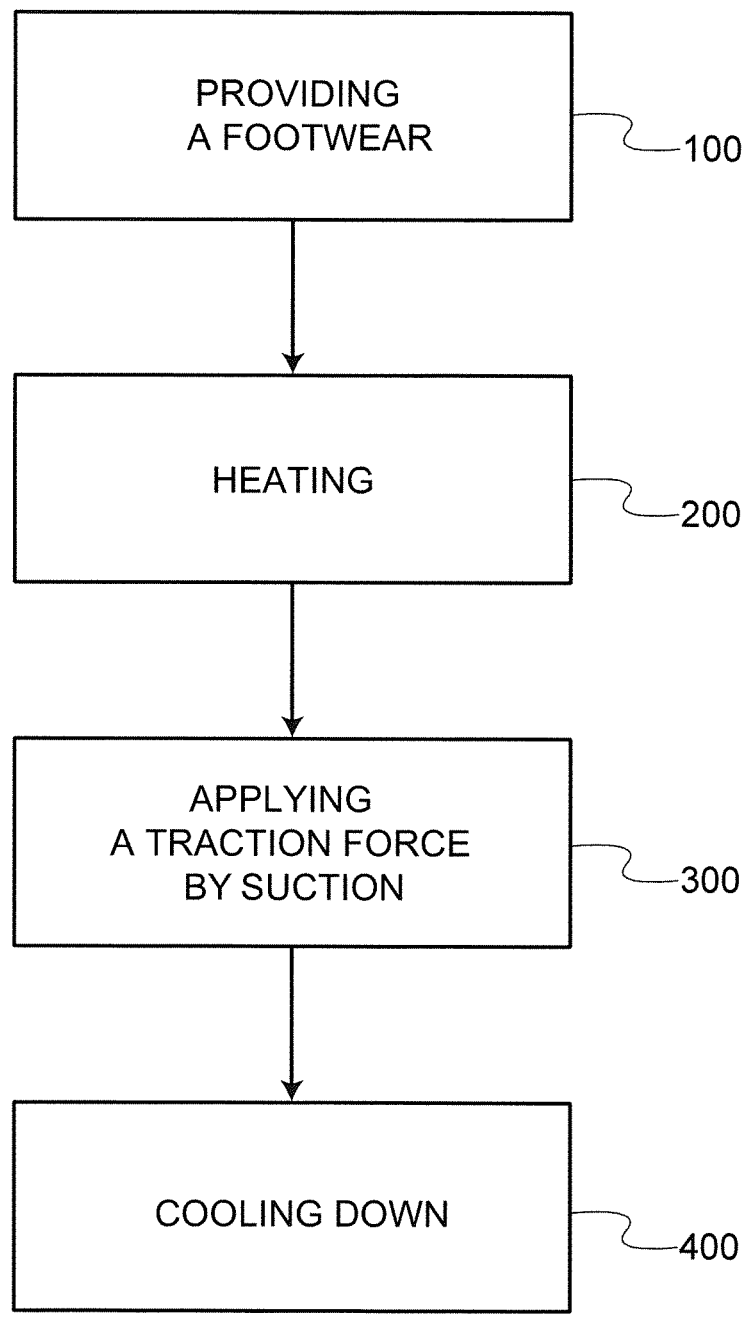
FIG. 1 is a block diagram showing the main steps of the method of the present invention, according to a first preferred embodiment.

Referring at first to FIG. 1, there are illustrated the main steps of the method according to the invention.

In a manner known per se, the method according to the invention comprises a first step 100 consisting in providing a footwear—more particularly a sports footwear—comprising at least one element made of thermoplastic material, such as, for instance, a ski boot comprising an outer shell of thermoplastic material, and a second step 200 consisting in heating the at least one element made of thennoplastic material until its temperature rises above a predeteiinine threshold. It will be apparent to those skilled in the art that the threshold temperature will be chosen high enough to allow shaping of the thermoplastic material.

The method according to the invention further comprises a third step 300 consisting in applying, from the outside of the footwear, a traction force to the element made of thermoplastic material, the traction force being oriented towards the outside of the footwear, while the temperature of the element made of thermoplastic material is above the threshold.

In particular, in the preferred embodiment of FIG. 1, the traction force directed towards the outside of the footwear is applied by generating a vacuum at the outer surface of the element made of thermoplastic material, thus generating a suction force acts on the element made of thermoplastic material by pulling it towards the outside of the footwear. In this way it is possible to locally deform the element made of thermoplastic material by pulling its surface away from the user's foot and therefore locally increasing the volume inside the footwear.

During a fourth step 400 of the method according to the invention, the element made of thermoplastic material is cooled down; once its temperature lowers to a sufficiently low temperature, the element retains its shape as previously defo med.

Thus it is possible to comfortably receive in the footwear feet that are locally large or have protrusions, especially in the malleolar region or in the metatarsal region.

In order to effectively adapt the footwear to the morphology of the user's foot, the step of deforming the element made of thermoplastic material—and possibly also the steps of applying the traction force and cooling down the element made of thermoplastic material—is (are) preferably carried out while the user's foot is placed in the footwear.

Figure 2:
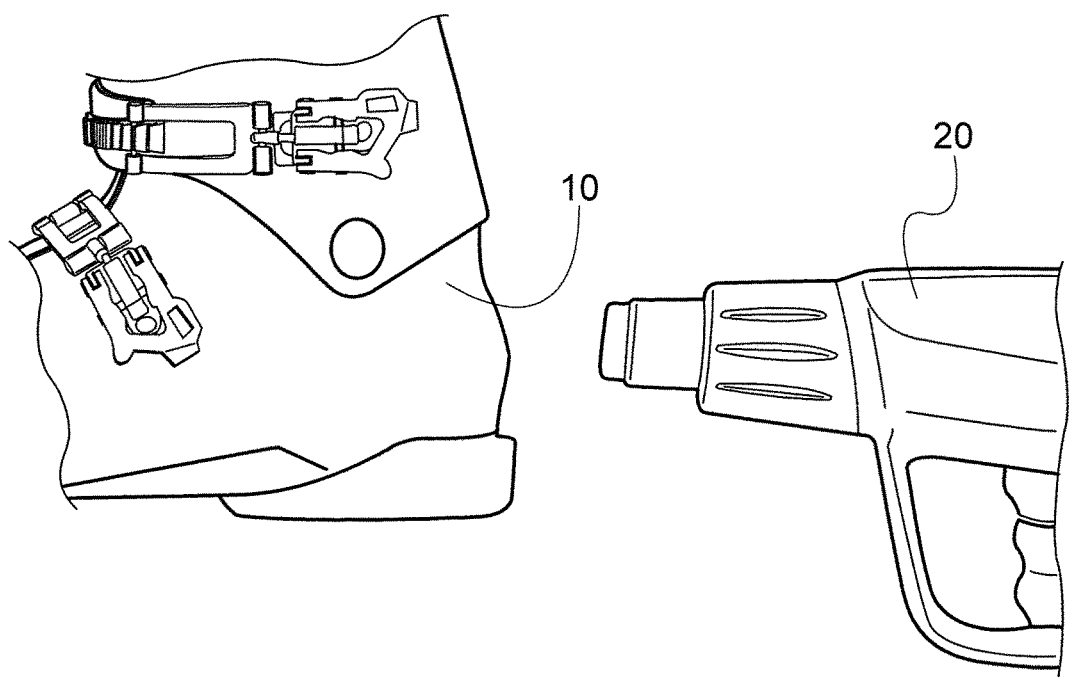
FIG. 2 schematically shows the heating means of the arrangement of the present invention, according to the first preferred embodiment of FIG. 1, applied to the outer shell of a ski boot.
Figure 3:
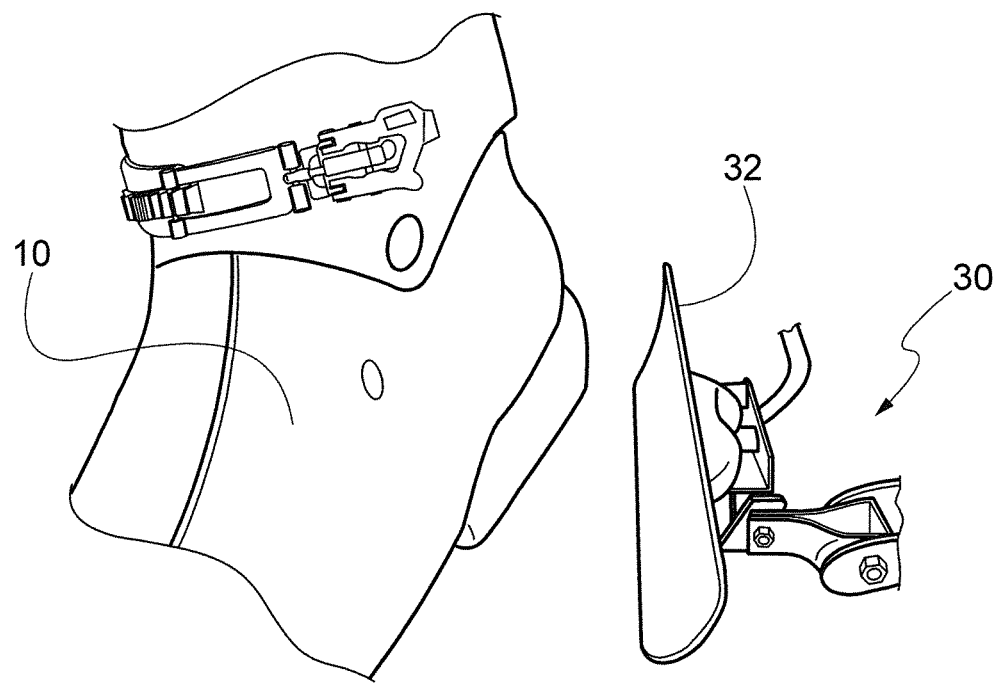
FIG. 3 schematically shows the shaping means of the arrangement of the present invention, according to the first preferred embodiment of FIG. 1, applied to the outer shell of a ski boot.

Referring to FIGS. 2 and 3, the arrangement capable of implementing the method described above correspondingly comprises:

heating means 20 for heating the element made of thermoplastic material 10 up to a temperature above the predetermined threshold (see FIG. 2);

shaping means 30 for applying, from the outside of the footwear, a traction force to the element made of thermoplastic material, the traction force being oriented towards the outside of the footwear (see FIG. 3), and more particularly shaping means 30 capable of applying, by generating a vacuum, a suction force to the outer surface of the element made of a thermoplastic material, thus generating a traction towards the outside.

In a manner known per se, the heating means 20 may comprise a heat gun or, preferably, an infrared heater. This kind of heater emits specific waves in the infrared range, which waves are absorbed by radiation by the wall of the shell. In comparison with heat guns, infrared heaters have the advantage of obtaining a more rapid and uniform heating.

In this embodiment, the shaping means 30 comprise a suction device (not shown) intended to generate a suction force and an interface element 32 connected to the suction device and intended to be applied to the outer surface of the element made of thermoplastic material. The suction device can be, for example, a vacuum pump or, preferably, a compressed air aspirator, which is more compact and silent than a vacuum pump.

Figure 4:
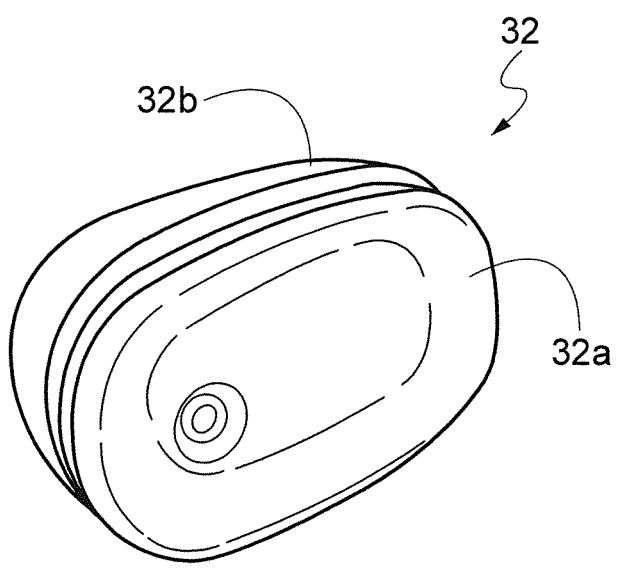
FIG. 4 shows in greater detail the shaping means of the arrangement of FIG. 3.

The interface element 32 connected to the suction device must be shaped so that it can be locally applied to the outer surface of element made of thermoplastic material. In the embodiment shown in FIG. 3, and in greater detail in FIG. 4, the interface element consists of a special suction cup 32 comprising a soft portion 32*a* suitable for adhering, by deformation, to the surface of the element made of thermoplastic material and a backing rigid portion 32*b* suitable for supporting the soft portion 32*a*. In this way, on one hand, thanks to the soft portion 32*a*, the suction cup 32 can tightly adhere to the surface of the element made of thermoplastic material, even in the case of the complex geometries of the shell of a ski boot; on the other hand, thanks to the rigid portion 32*b* which supports the soft portion 32*a* and prevents it from collapsing, the suction cup 32 allows expansion of the element made of thermoplastic material towards the outside so as to locally confer, to the surface of the element made of thermoplastic material, the desired convexity and to adapt it to the specific morphology of the user's foot.

The shaping means 30 can possibly comprise a plurality of suction cups, in order to deform a larger area or several different areas at the same time. It is also possible to provide that the shaping means 30 comprise a suction cup with a variable inner volume of the soft portion.

In addition, it is possible to advantageously provide that the heating means 20 and the shaping means 30 are made as a single device, and more particularly that the heating means 20 are integrate in the suction cup of the shaping means 30: the heating means—for example in the form of a resistance or an infrared heater—can be integrated in the suction cup of the shaping means, for example embedded therein or overmolded or glued thereto. This measure limits the number of components of the arrangement according to the invention and also allows to optimize the function thereof.

Figure 5:
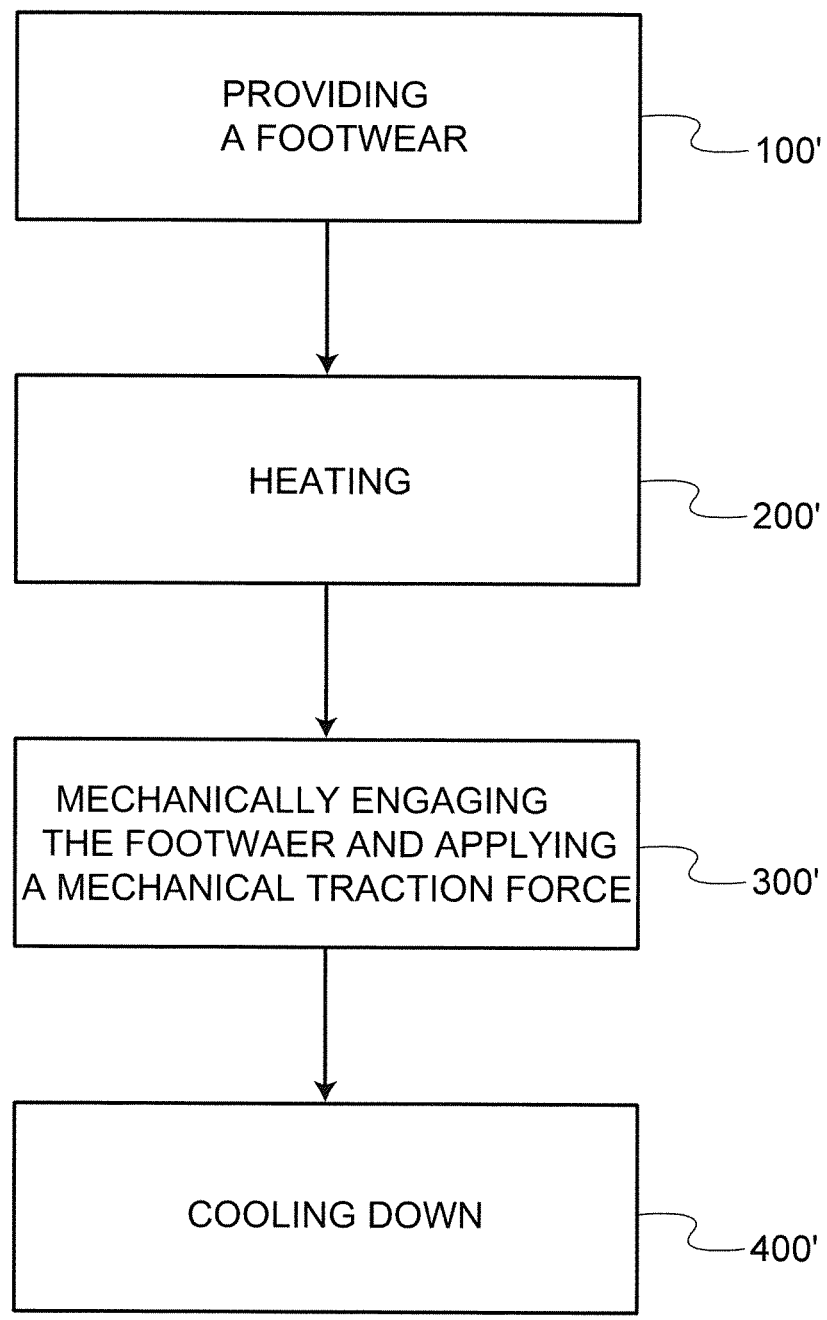
FIG. 5 is a block diagram showing the main steps of the method of the present invention, according to a second preferred embodiment.

Turning now to FIG. 5, there are schematically illustrated the main steps of the method according to a second embodiment of the invention.

In this embodiment, too, the method according to the invention comprises a first step 100' consisting in providing a footwear comprising at least one element made of thermoplastic material and a second step 200' consisting in heating the at least one element made of thermoplastic material up to a temperature above a predetermined threshold and therefore high enough to allow shaping of the thermoplastic material.

In this case, too, the method according to the invention further comprises a third step 300' consisting in applying, from the outside of the footwear, a traction force to the element made of thermoplastic material, the traction force being oriented towards the outside of the footwear, while the temperature of the element made of thermoplastic material is above the threshold.

In the embodiment of FIG. 5, the traction force oriented towards the outside of the footwear is applied by means of a mechanical force. The third step 300' therefore provides for mechanically engaging the outer surface of the element made of thermoplastic material and subsequently applying a traction oriented toward the outside. In this way it is possible to locally deform the element made of thermoplastic material by pulling its surface away from the user's foot and thus locally increasing the inner volume of the footwear.

During a fourth step 400' of the method according to the invention, the element made of thermoplastic material is then cooled down.

In order to effectively adapt the footwear to the morphology of the user's foot, in this case, too, the step of applying the traction force to the element made of thermoplastic material—and possibly also the steps of heating and cooling down the element made of thermoplastic material—is (are) preferably carried out while the user's foot is placed in the footwear.

The arrangement capable of implementing the method described above correspondingly comprises:

heating means for heating the element made of thermoplastic material up to a temperature above the predetermined threshold; the heating means are entirely similar to those illustrated in FIG. 2 with reference to the first embodiment of the invention;

shaping means for applying, from the outside of the footwear, a traction force to the element made of thermoplastic material, the traction force being oriented towards the outside of the footwear.

Figure 6:
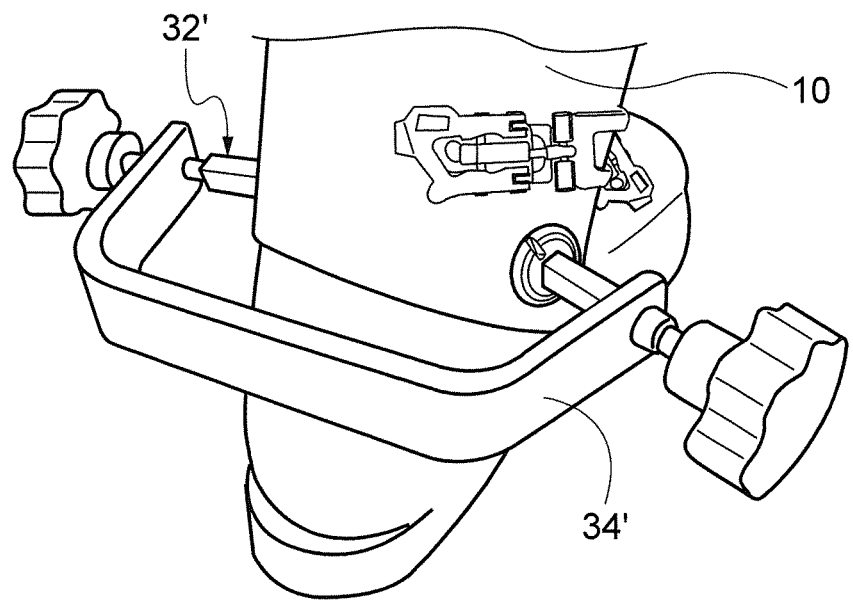
FIG. 6 shows the shaping means of the arrangement of the present invention, according to the second preferred embodiment of FIG. 5, applied to the outer shell of a ski boot.

The shaping means 30' are shown in FIG. 6 and comprise mainly engagement means 32' for mechanically engaging the surface of the element made of thermoplastic material and mechanical traction means 34' connected thereto. The engagement means 32' may have any shape suitable for being hooked on the surface of the element made of thermoplastic material, such as for instance jaws, clamps and the like. However, in order not to spoil the aesthetic appearance of the element made of thermoplastic material, it is possible to provide that the engagement means 32' comprise a female member 32*a*', integrated in or integral to the element made of thermoplastic material, and a male member 32*b*', connected to the mechanical traction means 34', the members cooperating with each other.

Figure 7:
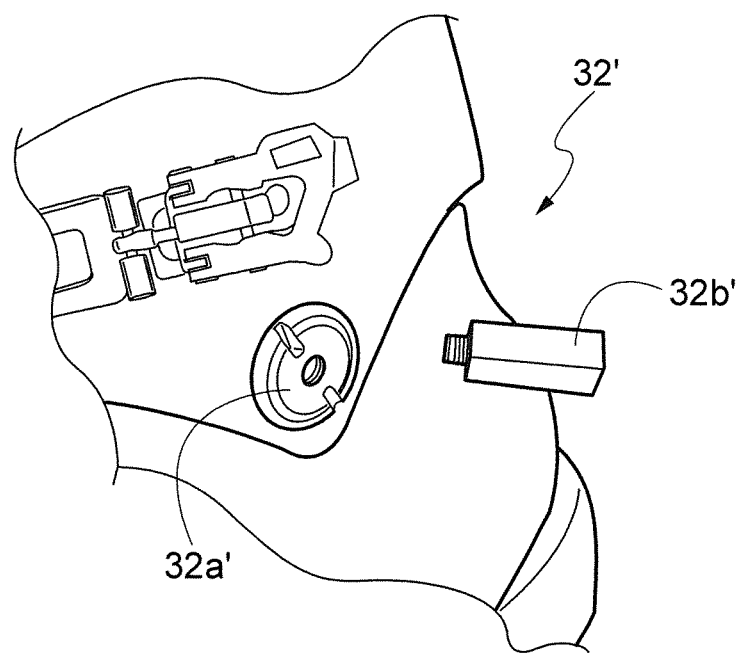
FIG. 7 shows in greater detail the shaping means of the arrangement of FIG. 6.

As better shown in FIG. 7, in the illustrated example the engagement means 32' comprise one or more eyelets which are integrated in the element made of thermoplastic material and are provided with a threaded bore (female member 32*a*') and corresponding threaded pins (male 32*b*') which can be screwed into the bore of a respective eyelet. It is apparent that the threaded coupling could be replaced with a snap coupling or other coupling types known to those skilled in the art.

The threaded pins 32*b*' are connected to the mechanical traction means 34', which in the example shown in FIG. 6 consist of an adjustable frame which allows to draw the threaded pins 32a', thus exerting a traction force localized in the area of the element made of thermoplastic material around the corresponding eyelets 32a'.

In the example of FIG. 6, the mechanical traction means 34' are configured so that they can be connected to a pair of threaded pins 32b' symmetrically arranged on the opposite sides of the shell made of thermoplastic material, namely in the malleolar region. However, it is clear that this configuration is to be considered merely as a non-limiting example. For instance, it is possible to provide that the threaded pins are arranged in a different region, for example on the opposite sides of the metatarsal region. Furthermore, it is possible to provide to exert traction in a single point at a time on the surface of the element made of thermoplastic material. In this case, the adjustable frame may include an outer rim that will keep firm the area surrounding the region to be deformed and a movable element connected to the threaded pin to exert a traction on the threaded pin.

From the above description, it is apparent that the invention allows to achieve the objects set forth above, as it allows to effectively adapt the shape of a footwear, more particularly a sports footwear, to the morphology of the particular user.

It is further evident that the embodiments described above are not to be regarded as limiting and that several modifications and variants are possible without departing from the scope of the invention as defined in the appended claims.

In particular, although the invention has been described with reference to a ski boot, it is also applicable to a large number of different footwear.

The invention claimed is:

1. A method for the customization of a footwear comprising an element made of thermoplastic material, the method comprising the steps of:
   heating the element made of thermoplastic material until its temperature rises above a predetermined threshold; and
   while the temperature of the element made of thermoplastic material is above the threshold, locally applying, from the outside of the footwear, a traction force to the element made of thermoplastic material, the traction force being oriented towards the outside of the footwear;
   wherein at least the step of applying the traction force to the element made of thermoplastic material takes place while a user's foot is placed in the footwear.

2. The method according to claim 1, further comprising a final cooling step, during which the temperature of the element made of thermoplastic material is lowered below the threshold.

3. The method according to claim 1, wherein the traction force is applied by generating a vacuum at a zone of an outer surface of the element made of thermoplastic material, thus generating a drawing force acting as a traction force on the element made of thermoplastic material.

4. The method according to claim 1, wherein the step of applying a traction force to the element made of thermoplastic material comprises in turn the steps of mechanically engaging an outer surface of the element made of thermoplastic material and successively applying a mechanical traction force.

* * * * *